US006862128B2

(12) United States Patent
Katase

(10) Patent No.: US 6,862,128 B2
(45) Date of Patent: Mar. 1, 2005

(54) ELECTRO-OPTICAL DEVICE, ELECTRONIC APPARATUS, METHOD FOR FORMING A COLORED LAYER, AND METHOD FOR MANUFACTURING THE ELECTRO-OPTICAL DEVICE

(75) Inventor: Makoto Katase, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 10/200,446

(22) Filed: Jul. 23, 2002

(65) Prior Publication Data
US 2003/0025985 A1 Feb. 6, 2003

(30) Foreign Application Priority Data

Jul. 25, 2001 (JP) ........................................ 2001-224982
May 14, 2002 (JP) ........................................ 2002-138986

(51) Int. Cl.⁷ ................................................ G09F 9/30
(52) U.S. Cl. ........................................ 359/296; 359/321
(58) Field of Search ................................. 359/296, 321; 345/107; 349/107, 111; 430/38

(56) References Cited

U.S. PATENT DOCUMENTS 3,668,106 A  *  6/1972  Ota ............................. 358/305
6,239,896 B1 *  5/2001  Ikeda ........................ 359/240

* cited by examiner

Primary Examiner—Scott J. Sugarman
Assistant Examiner—Richard Hanig
(74) Attorney, Agent, or Firm—Oliff & Berridge, PLC

(57) ABSTRACT

The present invention provides an electro-optical device for displaying sharp color images at low cost. The electro-optical device can include a first substrate, a second substrate facing the first substrate, an electro-optical layer which is disposed between the first and second substrates and which includes electrophoretic particles and a dispersion medium, and a colored layer which is located at a position corresponding to the electro-optical layer and which includes at least one color element, wherein at least a part of the dispersion medium has substantially the same color as that of the color element.

19 Claims, 12 Drawing Sheets

ELECTRO-OPTICAL DEVICE, ELECTRONIC
APPARATUS, METHOD FOR FORMING A
COLORED LAYER, AND METHOD FOR
MANUFACTURING THE ELECTRO-
OPTICAL DEVICE

BACKGROUND OF THE INVENTION

1. Field of Invention

The present invention relates to an electro-optical device, an electronic apparatus, a method for forming a colored layer, and a method for manufacturing the electro-optical device.

2. Description of Related Art

Currently, among non-emissive displays, an electrophoretic display utilizing the electrophoretic phenomenon is known. Electrophoresis is a phenomenon in which particles are caused to migrate by a Coulomb force when a voltage is applied to a disperse system in which particles (electrophoretic particles) are dispersed in a liquid (dispersion medium).

An electrophoretic display has a basic structure in which electrodes oppose each other with a predetermined distance therebetween, and the portion between the electrodes is filled with a disperse system. When potential difference is given to the electrodes, charged electrophoretic particles are attracted to either of the electrodes, depending on the direction of the electric field. When a dispersion medium is colored with a dye, and the electrophoretic particles include a pigment, observers see the color of either the electrophoretic particles or the dispersion medium. When the electrodes are formed by patterning, images can be displayed by controlling the voltage applied to the electrodes.

SUMMARY OF THE INVENTION

Because of its qualities, the above electrophoretic display draws attention as an alternative to a liquid crystal display. However, in order to use the electrophoretic display as a display device for electronic apparatuses, it is necessary to colorize the display.

The present invention has been made to solve the above problem, and an object of the present invention to provide an electro-optical device that is capable of providing a sharp color display at low cost.

It is another object of the present invention to provide an electronic apparatus having the above electro-optical device.

It is another object of the present invention to provide a method for forming a colored layer adapted to electro-optical devices.

It is another object of the present invention to provide a method for manufacturing the electro-optical device.

The present invention can provide an electro-optical device having an electro-optical layer including electrophoretic particles and a dispersion medium, and a colored layer provided at the viewing side of the electro-optical layer. That is, the present invention provides a color electro-optical device having the colored layer disposed on the viewing side of the electro-optical layer.

The present invention can also provide an electro-optical device further including a first substrate and a second substrate facing the first substrate, wherein the electro-optical layer and the colored layer are placed between the first and second substrates. According to the above configuration, it is not necessary to prepare separately a color filter, and the electro-optical device for displaying color images can be provided at low cost.

The present invention provides an electro-optical device further including a first electrode provided on the first substrate and a second electrode provided on the second substrate, wherein the electro-optical layer and the colored layer are placed between the first and second electrodes.

The present invention provides an electro-optical device further including a plurality of dot regions, wherein the colored layer includes a plurality of color elements having different colors, and each of the plurality of dot regions corresponds to at least one of the plurality of color elements.

According to the above configuration, the electro-optical device displays different colors for each of the dot regions.

The present invention provides an electro-optical device in which each of the plurality of dot regions is separated by a partition. According to the above configuration, since the dispersion medium in the electro-optical layer is isolated for each dot region, uneven distribution of the electrophoretic particles does not arise, and therefore the electro-optical device has high display quality and excellent reliability.

The present invention provides the electro-optical device in which the electro-optical layer further includes capsules for containing the dispersion medium and the electrophoretic particles. According to the above configuration, since an area in which the electrophoretic particles migrate is limited to the inside of the capsules, uneven distribution of the electrophoretic particles does not arise, and therefore the electro-optical device has high display quality and excellent reliability.

The present invention provides an electro-optical device in which the electro-optical layer can include a plurality of types of the capsules, the colored layer includes the plurality of color elements having different colors, and each of the plurality of types of capsules corresponds to at least one of the plurality of color elements. According to the above configuration, since at least one color element is disposed for each capsule, uneven distribution of the electrophoretic particles does not arise, and therefore the electro-optical device has high display quality and excellent reliability.

The present invention can provide an electro-optical device, in which the colored layer has conductivity. According to the above configuration, the colored layer having conductivity reduces the capacitance formed in the colored layer by coloring material dispersed in the colored layer. Thus, the voltage applied to the electro-optical layer to cause the electrophoretic particles to migrate is decreased, so that the electro-optical device can be driven with low voltage.

The present invention can provide an electro-optical device including a first substrate, a second substrate facing the first substrate, an electro-optical layer including electrophoretic particles and a dispersion medium, the electro-optical layer being placed between the first and second substrates, and a colored layer including at least one color element, the colored layer being located at a position corresponding to the electro-optical layer, wherein at least a part of the dispersion medium has substantially the same color as that of the color element.

According to the above configuration, since the colored layer located at a position corresponding to the electro-optical layer disposed between the first and second substrates has substantially the same color as that of the dispersion medium in the electro-optical layer, sharp color images can be displayed and the electro-optical device can be provided at low cost.

The present invention provides an electro-optical device in which the color elements included in the colored layer are dispersed in the dispersion medium. According to the above configuration, since the colored layer is colored with the color elements for coloring the dispersion medium, the electro-optical device displays color images without separately using a color filter and is thus provided at low cost. The color patterns of the colored layer can be changed simply by changing the colors of the color elements.

The present invention provides an electro-optical device further including a plurality of dot regions, in which the colored layer includes a plurality of color elements having different colors. Each of the plurality of dot regions can correspond to at least one of the plurality of color elements, and in the dot regions, the dispersion medium has substantially the same color as that of the color elements corresponding to the dispersion medium. According to the above configuration, since each of the dot regions comprises the colored layer, the electro-optical device displays any images with desired colors.

The present invention provides the electro-optical device in which each of the plurality of dot regions is separated by a partition. According to the above configuration, since the dispersion medium in each of the dot regions partitioned by the partitions has any color, the electro-optical device has dot regions each showing a different color.

The present invention provides an electro-optical device in which the first substrate has electrodes on the inside face thereof and the colored layer is disposed between the electrodes and the electro-optical layer.

The present invention can also provide an electro-optical device in which the colored layer has a member with a plurality of pores, the dispersion medium includes coloring material having the diameter the same as or smaller than that of the pores, and the electrophoretic particles have a diameter larger than that of the pores. According to the above configuration, since only the coloring material contained in the dispersion medium is dispersed to the colored layer side through the pores and the electrophoretic particles migrate only in the dispersion medium, the migration of the electrophoretic particles in the dispersion medium is not restricted, so that the electrophoretic device has excellent reliability.

The present invention provides an electro-optical device in which the coloring material includes a dye. According to the above configuration, since the coloring material contains a dye, the coloring material readily moves in the dispersion medium and is readily distributed in the colored layer.

The present invention provides an electro-optical device in which the electro-optical layer further includes capsules containing the dispersion medium and the electrophoretic particles. According to the above configuration, since the area in which the electrophoretic particles migrate is limited to the inside of the capsules, the distribution of the electrophoretic particles in the electro-optical layer is uniform, so that the electro-optical device has excellent reliability.

The present invention can also provide an electro-optical device in which the electro-optical layer includes a plurality of types of capsules, the colored layer includes the plurality of color elements having different colors, each of the plurality of types of capsules corresponds to at least one of the plurality of color elements, and in the capsules, the dispersion medium has substantially the same color as that of the color elements corresponding to the dispersion medium. According to the above configuration, since an electro-optical layer corresponding to each color element is controllable and the capsules have the same color as that of the colored layer, sharp color images can be displayed.

The present invention provides an electronic apparatus having any one of the above-described electro-optical devices functioning as a display portion. According to the above configuration, an electronic apparatus having a display portion for displaying sharp color images can be provided at low cost.

Additionally, the present invention can provide a method for forming a colored layer including the steps of changing the relative positional relationship between a porous member and a head discharging a material, and discharging the material onto the porous member, wherein the material includes a coloring material having a size smaller than that of the pores of the member. According to the above configuration, since the material containing the coloring material that can be dispersed in the porous member to color the member is arranged at an arbitrary position on the porous member, the plurality of materials containing coloring material having different colors can efficiently be placed.

Further, the present invention provides a method for forming a colored layer in which the coloring material includes a dye. According to the above configuration, since the coloring material including a dye can readily be dispersed in the porous member, the porous member is uniformly colored.

The present invention can provide a method for manufacturing an electro-optical device having a plurality of dot regions, including the steps of changing the relative positional relationship between a head discharging a material and a substrate provided with porous members corresponding to the dot regions, and discharging the material onto the porous member from the head, wherein the material includes a coloring material having a size smaller than that of pores of the member.

According to the above configuration, since the material is placed at any position on the porous member and the porous member is thus colored with the coloring material contained in the material to form the colored layer, an electro-optical device for displaying color images with the colored layer can be efficiently manufactured.

The present invention provides a method for manufacturing an electro-optical device in which the material includes electrophoretic particles, and the electrophoretic particles have a diameter larger than that of the pores provided in the member. According to the above configuration, since the electrophoretic particles do not enter the porous member, the porous member does not prevent the electrophoretic particles from migrating, so that the electro-optical device has a high display quality and excellent reliability.

BRIEF DESCRIPTION OF THE DRAWINGS

The invention will be described with reference to the accompanying drawings, wherein like numerals represent like elements, and wherein.

DETAILED DESCRIPTION OF PREFERRED EMBODIMENTS

Figure 1:
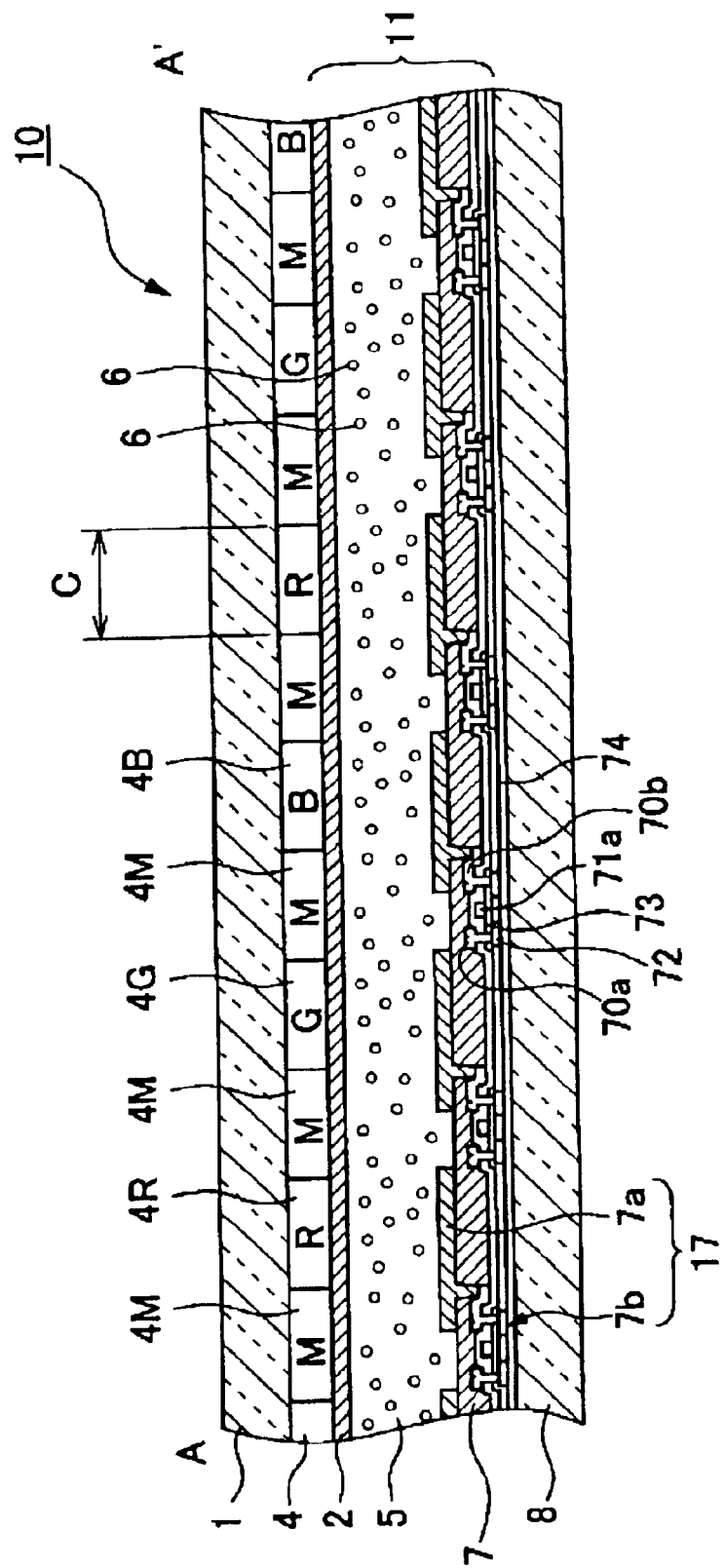
FIG. 1 is a perspective view showing a configuration of an electrophoretic display according to a first embodiment of the present invention.
Figure 2:
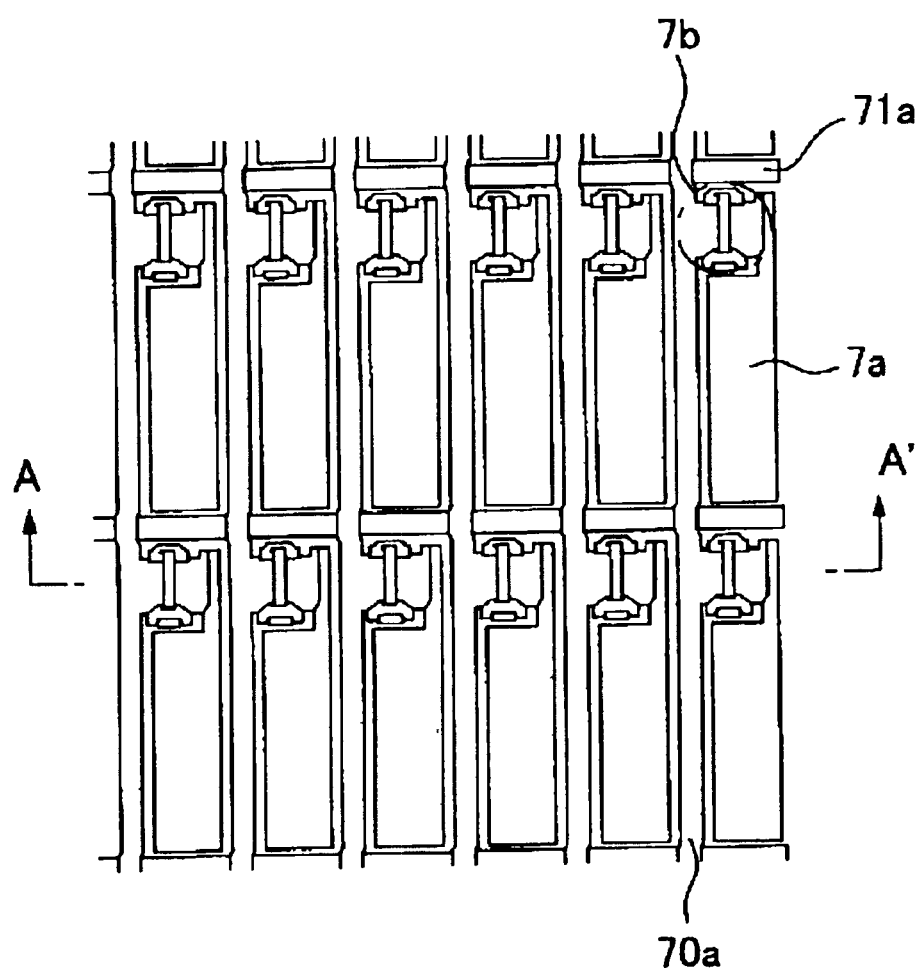
FIG. 2 is a plan view of the electrophoretic display shown FIG. 1.

FIG. 1 is a perspective view schematically showing an active matrix electrophoretic display, which is an electro-optical device of a first embodiment according to the present invention. FIG. 2 is a plan view of the active matrix electrophoretic display shown in FIG. 1. FIG. 1 shows the cross sectional structure taken along the line I—I of FIG. 2.

Referring to the above figures, in an electrophoretic display 10, an electrophoretic layer (electro-optical layer) 11 is disposed between a first substrate 1 and a second substrate 8. A colored layer 4 and common electrode 2 are disposed on the inside of the first substrate 1 (on the side of the electrophoretic layer 11) in that order, and an element region 7 having a plurality of pixel electrodes 7a and the like is disposed on the inside of the second substrate 8 (on the side of the electrophoretic layer 11). On the side of the first substrate 1, the first substrate 1, the colored layer 4, and the common electrode 2 are light transmitting. The outer face of the first substrate 1 functions as a display surface of the electrophoretic display 10. The second substrate 8 having the element region 7 may further have various peripheral devices, not shown, for controlling the element region 7. The common electrode 2 is disposed on the side of the first substrate 1 and the element region 7 is located on the side of the second substrate 8 in this embodiment. However, the element region 7 may be located on the side of the first substrate 1.

The first substrate 1 can include, for example, a transparent glass or transparent film substrate, having light-transmitting property. The second substrate 8 does not necessarily have transparency and can include, for example, a glass or resin film substrate.

Referring to FIG. 1, the electrophoretic layer 11 has a dispersion medium 5 and a plurality of electrophoretic particles 6 dispersed therein. The dispersion medium 5 can include water; an alcohol solvent, such as methanol, ethanol, isopropanol, butanol, octanol, and methyl cellosolve; esters such as ethyl acetate and butyl acetate; ketones such as acetone, methyl ethyl ketone, and methyl isobutyl ketone; aliphatic hydrocarbons such as pentane, hexane, and octane; alicyclic hydrocarbons such as cyclohexane and methylcyclohexane; aromatic hydrocarbons such as benzene, toluene, and xylene; long-chain alkylbenzenes such as hexylbenzene, heptylbenzene, octylbenzene, nonylbenzene, decylbenzene, undecylbenzene, dodecylbenzene, tridecylbenzene, and tetradecylbenzene; hydrocarbon halides such as methylene chloride, chloroform, carbon tetrachloride, and 1,2-dichloroethane; carboxylate; and other oils. These compounds can be used alone, or the mixture thereof further containing a surfactant can also be used.

The electrophoretic particles 6 include organic or inorganic particles (polymer or colloid) having the property of migrating in the dispersion medium due to electrophoresis caused by a potential difference. For example, one or more kinds of white pigments such as titanium oxide, hydrozincite, and antimony oxide can be used. Theses pigments may further contain charge-controlling agents having particles including electrolytes, surfactants, metal soap, resins, rubber, oil, varnish, or compounds; dispersants such as titanium coupling agents, aluminum coupling agents, and silane coupling agents; lubricants; and stabilizing agents.

It should be understood that the combination of the dispersion medium 5 and the electrophoretic particles 6 is not particularly limited, and it is preferable that the dispersion medium 5 and the electrophoretic particles 6 have substantially the same density in order to avoid the precipitation of the electrophoretic particles 6 by gravitation.

FIG. 2 is a plan view showing the configuration of the image displaying region of a electrophoretic display according to the present embodiment. As shown, the image displaying region has a plurality of pixel portions 17 (pixel electrodes 7a and TFT elements 7b) arranged in a matrix, data lines 70a, and scanning lines 71a. In the electrophoretic display of this embodiment, each of a plurality of displaying units, which are arranged in a matrix and are included in the image-displaying region, includes one of the pixel electrodes 7a functioning as transparent conductive layers and one of the TFT elements 7b for controlling the current supplied to the pixel electrodes 7a, and each of the data lines 70a to which image signals are supplied is electronically connected to each of the sources of the TFT elements 7b. Image signals written on the data lines 70a are line-sequentially supplied or are supplied by group to the plurality of data lines 70a neighboring each other.

Each of the scanning lines 71a is electrically connected to one of the gates of the TFT elements 7b, so that scanning signals are line-sequentially supplied to the plurality of scanning lines 71a intermittently with predetermined timing. Each of the pixel electrodes 7a is electrically connected to each of the drains of the TFT elements 7b, so that image signals supplied from each data line 70a are written at a predetermined timing by turning on each TFT element 7b for a predetermined period. The image signals, having a predetermined level, written on each pixel electrode 7a are held between the common electrode 2 and the pixel electrode 7a for a given period. Electrically charged particles are attracted to an electrode that is one of the pixel electrode 7a and the common electrode 2 and that has a polarity opposite to that of the charged particles, so that a grayscale can be displayed using the contrast between the color of the charged particles and the color of the dispersion medium.

As shown in FIG. 2, a plurality of the pixel electrodes 7a are arranged in a matrix on an element substrate, and the data lines 70a and the scanning lines 71a extend along vertical and horizontal boundaries of the pixel electrodes 7a. In this embodiment, each of the display units (dots) is the display region provided in an area surrounded by each of the data lines 70a and each of the scanning lines 71a, so that it is possible to perform display in each of the display units, which are arranged in a matrix.

As shown in FIG. 2, a colored layer 4 has a configuration in which a plurality of colored portions (color elements) 4R, 4G, and 4B are arranged in a matrix in plan view, and the colored portions 4R, 4G, and 4B are red, green, and blue, respectively. One pixel of the electrophoretic display 10 according to the present embodiment includes the colored portions 4R, 4G, and 4B, the pixel portions 17 of the element region 7 located at positions opposing the colored portions, the electrophoretic layer 11 placed between the colored portions and the pixel portions 17. That is, the electrophoretic display 10 of this embodiment is capable of full color display, and each pixel shows one of the three primary colors (RGB). The common electrode 2 comprises a transparent conductive material such as ITO (indium tin oxide).

In the electrophoretic display 10 having the above configuration, an electric field is formed between each of the pixel electrodes 7a located on the side of the second substrate 8 and the common electrode 2 located on the side of the first substrate 1 to make the electrophoretic particles 6 in the electrophoretic layer 11 migrate, so that a grayscale is displayed in response to data signals supplied to the pixel electrodes 7a. That is, in the electrophoretic display 10 of this embodiment, the dispersion of the electrophoretic particles 6 in the electrophoretic layer 11 in the thickness direction is controlled using the intensity of the electric field applied to the electrophoretic layer 11, so that the absorbance of light reflected by the electrophoretic particles 6 is adjusted. As a result, the intensity of light reaching observers can be changed.

As described above, in the electrophoretic display 10 of this embodiment, since the colored layer 4 is placed between the first substrate 1 and the second substrate 8, which face each other, sharp color images can be a displayed and low-cost production can be achieved because color filters are not separately required.

Figure 3:
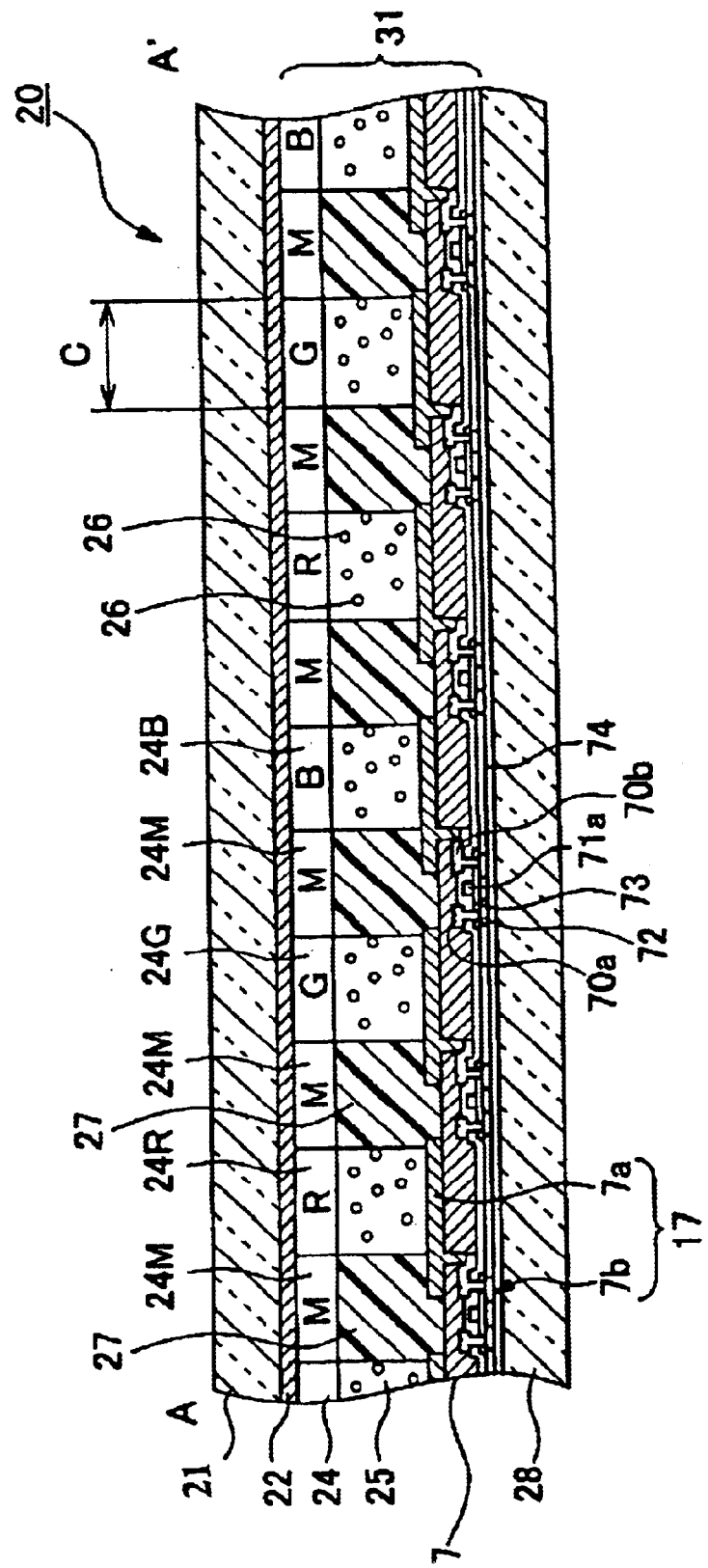
FIG. 3 is a perspective view showing a configuration of an electrophoretic display according to a second embodiment of the present invention.
Figure 4:
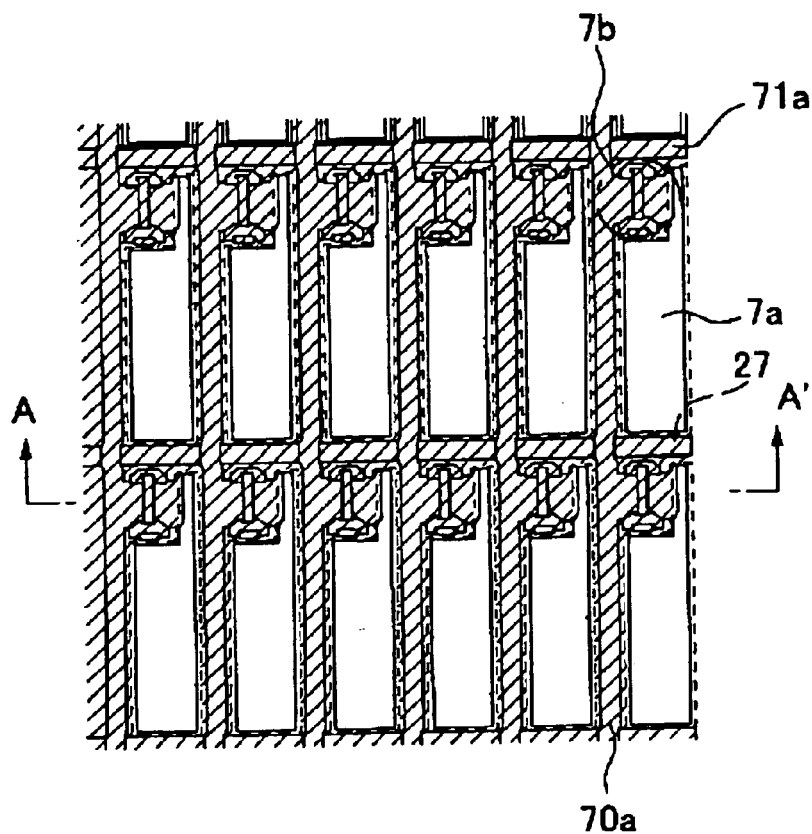
FIG. 4 is a plan view of the electrophoretic display shown FIG. 3.

An electrophoretic display of a second embodiment according to the present invention will now be described with reference to FIGS. 3 and 4. FIG. 3 is a sectional view showing the configuration of an electrophoretic display 20 of this embodiment and FIG. 4 is a partial plan view of the electrophoretic display shown in FIG. 3. FIG. 3 shows the sectional structure taken along the line II—II shown in FIG. 4.

In the electrophoretic display 20, an electrophoretic layer (electro-optical layer) 31 is disposed between a first substrate 21 and a second substrate 28, a colored layer 24 and common electrode 22 are disposed on the inside of the first substrate 21 (on the side of the electrophoretic layer 31) in that order, and an element region 7 having a plurality of pixel electrodes 7a and the like is disposed on the inside of the second substrate 28 (on the side of the electrophoretic layer 31). The first substrate 21, the colored layer 24, and the common electrode 22 are light transmitting on the first substrate 21 side. The outer face of the first substrate 21 functions as a display surface of the electrophoretic display 20.

The first substrate 21 and the second substrate 28 may have the same configurations as those of the first substrate 1 and the second substrate 8 of the first embodiment shown in FIG. 1. The common electrode 22 disposed on the inside of the first substrate 21 can include a transparent material, such as ITO. The element region 7 disposed on the inside of the second substrate 28 has the same configuration as that of the other element region shown in FIG. 1. In this embodiment, the common electrode 22 is disposed on the side of the colored layer 24, and the element region 7 may be disposed between the colored layer 24 and the first substrate 21. In the latter case, pixel electrodes 7a in the element region 7 can include a transparent material, such as ITO.

The electrophoretic layer 31 according to the present embodiment includes the colored layer 24 disposed on the side of the first substrate 21 and partitions 27 having a certain height in the thickness direction of the electrophoretic display 20 and forming lattice-work in plan view. Each region partitioned by the portions 27 contains a dispersion medium 25 and electrophoretic particles 6 in a sealed manner. In the electrophoretic display 20 of this embodiment, the region partitioned by the partitions 27 is referred to as a partitioned cell C and each pixel corresponds to the partitioned cell C. In such a configuration, since the electrophoretic particles 26 dispersed in the dispersion medium 25 are allowed to migrate only inside the partitioned cell C, the uneven distribution of the particles and the formation of agglomerations having the plurality of particles in the electrophoretic layer 31 are effectively prevented. Thus, the quality of displayed images is improved.

In this embodiment, one partitioned cell C corresponds to one pixel, and a plurality of colored portions and pixel portions 17 may be provided in one partitioned cell C.

As shown in FIG. 4, the plurality of pixel electrodes 7a are arranged in a matrix on an element substrate, and the data lines 70a and the scanning lines 71a extend along vertical and horizontal boundaries of the pixel electrodes 7a. In this embodiment, each of the display units (dots) are the display region provided in an area surrounded by each of the data lines 70a and each of the scanning lines 71a, so that it is possible to perform display in each of the display units arranged in a matrix.

The partitions 27, shown by the diagonally shaded areas in FIG. 4, are located to overlap in a plan view with the data lines 70a and the scanning lines 71a, which are wires, and the TFT elements 7b. As shown in FIG. 3, each of the partitions 27 are located between the pixel electrodes 7a so as to partition the color display units corresponding to respective colors of color filters, which are red (R), green (G), and blue (B).

Figure 5:
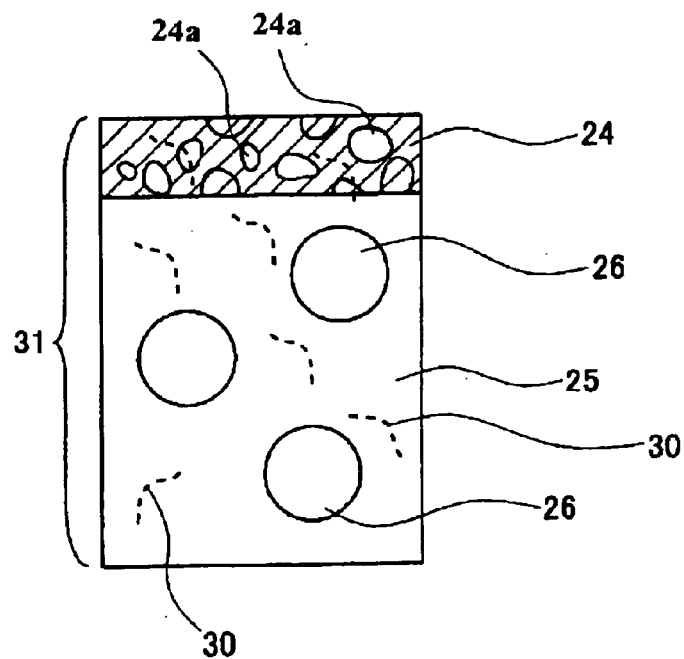
FIG. 5 is an enlarged sectional view showing the configuration of the electrophoretic display shown FIG. 3.

The dispersion medium 25 of the electrophoretic layer 31 according to the present embodiment is colored with coloring material containing a dye. Since the colored layer 24 is also colored with the same coloring material, the dispersion medium 25 and the colored layer 24 have substantially the same color. The configuration of the electrophoretic layer 31 will now be described in detail with reference to FIG. 5. FIG. 5 is an enlarged sectional view showing the configuration of the electrophoretic layer 31 shown in FIG. 3.

In the electrophoretic layer 31 shown in FIG. 5, the colored layer 24, which is placed at the upper area in the figure, is immersed in the dispersion medium 25, in which electrophoretic particles 26 and coloring material 30 are dispersed. The colored layer 24 can include a porous body having a large number of pores 24a, and the dispersion medium 25 and the coloring material 30 are dispersed in the colored layer 24 through the pores 24a to color the colored layer 24. Since the pores 24a have a diameter smaller than that of the electrophoretic particles 26, the electrophoretic particles 26 cannot enter the colored layer 24 including the porous body and can migrate only in the dispersion medium 25 in the partitioned cell.

The electrophoretic particles 26 may include, for example, a white pigment such as titanium oxide, hydrozincite, and antimony oxide.

The porous material for the colored layer 24 may include, for example, porous glass. The porous glass may be prepared by the following manufacturing method. NaO—$B_2O_3$—$SiO_2$ glass is prepared from $SiO_2$ (silica sand), $H_3BO_3$ (boric acid), and $Na_2CO_3$ (soda ash), which are raw materials, by a well-known melting process. When the resulting glass is then heat-treated at several hundred degrees centigrade, a $SiO_2$ rich phase and a $Na_2O$—$B_2O_3$ rich phase are formed in the glass on a scale of several nanometers due to spinodal decomposition. The phase separated glass is immersed in an acidic solution to dissolve only the $Na_2O$—$B_2O_3$ rich phase and porous glass having a $SiO_2$ framework is then obtained. The porous glass obtained by this method has perforating pores extending from the surface to the inner part. Thus, when the porous glass is used as the colored layer 24, a dye easily permeates the inside. The pore diameter of the porous glass is readily controlled by the thermal treatment conditions.

Other porous material may be porous silicon, porous ceramics, porous gels prepared by a sol-gel method, or the like. Since these porous materials contain an inorganic substance as a main component, deterioration by ultraviolet radiation rarely occurs and excellent weather resistance is obtained. Thus, a long-life electrophoretic display can be achieved.

There can be an advantage in that the coloring material in the dispersion medium 25 supplements the material coloring the colored layer 24.

The colored layer 24 may include any one of the above materials as the porous material therefor, and preferably include one having the refractive index the same as or close to that of the dispersion medium 25. When both refractive indexes are substantially the same, the scattering caused by a differential between the different refractive indexes is reduced to achieve a display having high contrast and color purity.

Figure 6:
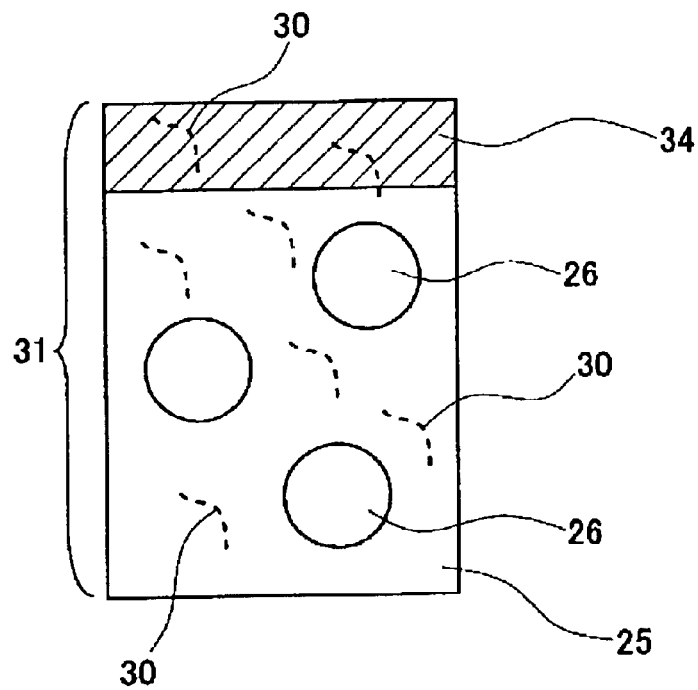
FIG. 6 is a sectional view showing another configuration of the electrophoretic display shown FIG. 3.

While the colored layer 24 including a porous material is described above, another colored layer used in an electrophoretic display according to the present invention may include a colorable material which is readily colored by the permeation of a dye. FIG. 6 is a sectional view showing the configuration of the electrophoretic layer 31 having another colored layer 34 including such a colorable material. As shown in the figure, the colored layer 34 includes the colorable material and the colored layer 34 is colored with coloring material contained in the dispersion medium 25 and thus has substantially the same color as that of the dispersion medium 25. The colorable material may include, for example, a polyimide resin, a colorable resist prepared by adding a bichromate into a water-soluble polymer such as gelatin, casein, and the like. When the colored layer 34 includes such a colorable material, it is preferable that the electrophoretic particles 26 do not enter the colored layer 34.

Figure 7:
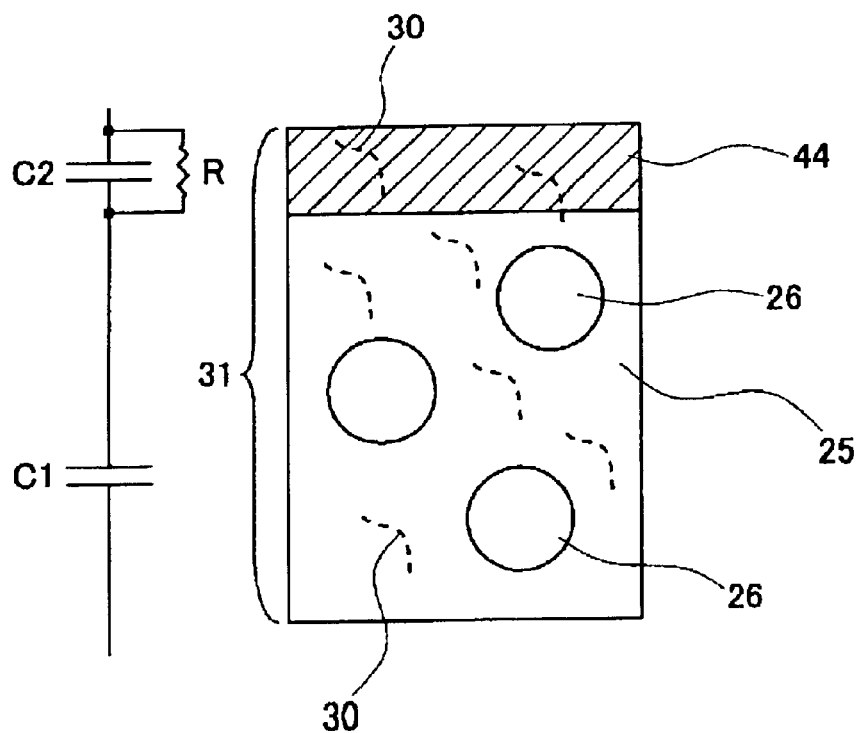
FIG. 7 is a sectional view showing another configuration of the electrophoretic display shown FIG. 3.

The colored layers 24 and 34 according to the present embodiment may have conductivity. In such a configuration, the electrophoretic layer 31 can be driven with a low voltage. The configuration will now be described with reference to FIG. 7. FIG. 7 is a sectional view showing the configuration of the electrophoretic layer 31 including a colored layer 44 having conductivity. A circuit for the electrophoretic layer 31 is also shown in FIG. 7.

Electrodes for driving the electrophoretic particles 26 are disposed on both outer faces (upper and lower faces in the figure) of the electrophoretic layer 31. If the colored layer 44 does not have conductivity, a region of the electrophoretic layer 31 containing the electrophoretic particles 26 functions as a capacitor C1 and the colored layer 44 functions as another capacitor C2. However, since the colored layer 44 has conductivity in this configuration, the colored layer 44 functions as a resistance, which is indicated with R in the circuit diagram, and a path bypassing the capacitor C2 is formed. Accordingly, the capacitance of the electrophoretic layer 31 is substantially reduced and the electrophoretic particles 26 can thus be driven with a low voltage.

Figure 8:
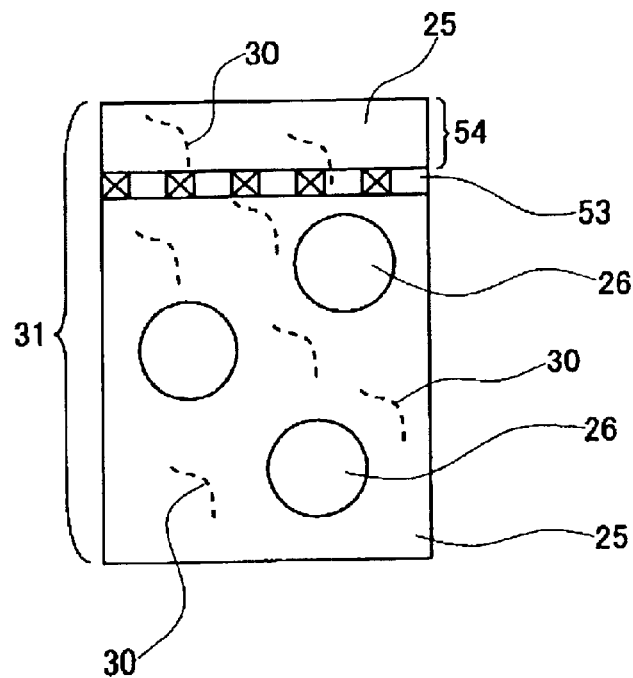
FIG. 8 is a sectional view showing another configuration of the electrophoretic display shown FIG. 3.

As shown in a sectional view in FIG. 8, in the electrophoretic layer 31 according to the present invention, the partitioned cell C is further partitioned into two parts with a translucent film 53. When the electrophoretic particles 26 are situated only in the one part (lower part in the figure) of the two, the other part in which the electrophoretic particles 26 are not situated may function as a colored layer 54. The dispersion medium 25 and the coloring material 30 pass through the translucent film 53 while the electrophoretic particles 26 cannot pass through the translucent film 53. The materials for the translucent film 53 are not limited as long as the materials have light-transmitting property, and may include polyimides and silicone.

In the configurations shown in FIGS. 5 to 8, the electrophoretic display of this embodiment has a colored layer in the electrophoretic layer 31, and thus provides sharp color images without separately requiring a color filter. Accordingly, the present invention provides an electrophoretic display providing high quality images at low cost.

The electrophoretic display 20 of this embodiment having the above configuration provides a grayscale for each partitioned cell C.

The principle of the light modulation is described below. The intensity I of incident light is resolved into three components (IR, IG, and B) corresponding to the wavelengths of the three primary colors. This is expressed by formula (1) as follows:

$$I = IR + IG + IB \quad (1)$$

While full-color display requires controlling the three colors, a partitioned cell C having a monochrome colored portion 24R is described herein. When colors other than red are absorbed by a colored portion 24R, the reflective intensity (Irefon) in a bright (ON) state is defined as the product of the red light transmittance (Tfr) of the colored portion 24R and the reflectance (Rr) of the electrophoretic particles and is expressed by formula (2), wherein Ir represents the intensity of the incident light, as follows:

$$\text{Irefon} = Ir \cdot Tfr^2 \cdot Rr \quad (2)$$

The reflective intensity (Irefoff) in a dark (OFF) state is defined as the product of the reflectance of each component, the transmittance (Tr) per unit length of a solvent, and the optical path length (Lr) and is expressed by formula (3) as follows:

$$\text{Irefoff} = Ir \cdot Tfr^2 \cdot Tr^2 Lr^2 \cdot Rr \quad (3)$$

Figure 9:
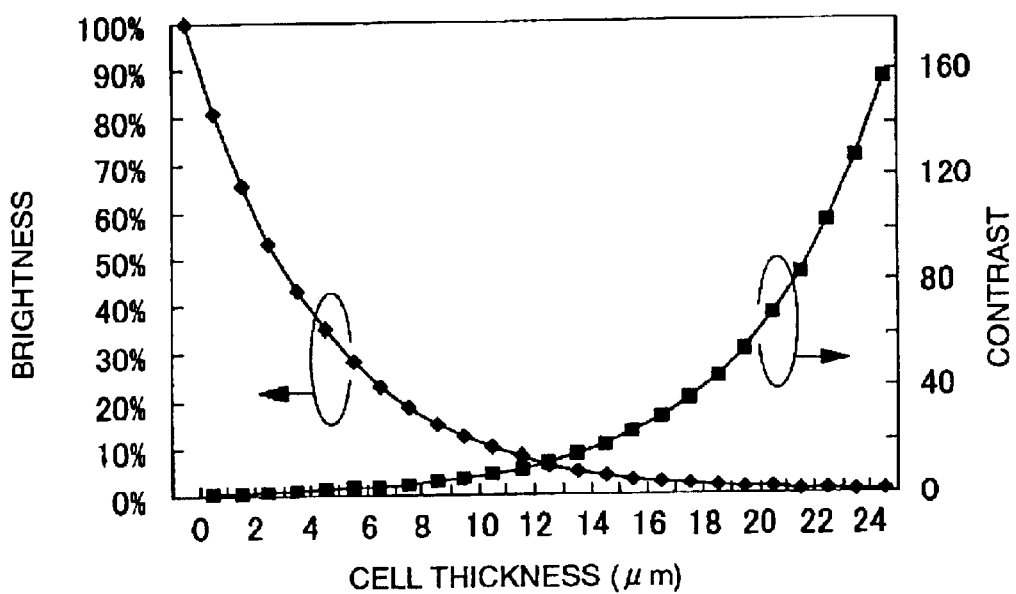
FIG. 9 is a graph showing the relationship between the display brightness and the contrast of the electrophoretic display shown FIG. 3.

FIG. 9 shows the relationship between cell length, brightness, and contrast, wherein the brightness and the contrast are obtained using the above formulas. The number of each point in the graph shown in FIG. 9 is described in Table 1. The brightness and the contrast shown in the figure and the table are calculated values based on the assumption that the colored portion 24R and the dispersion medium 25 both have a transmittance of 90% per 1 μm. In the electrophoretic display shown in FIG. 3, the state in which the electrophoretic particles 26 touch the inner face of the colored layer 24 (the state in which most electrophoretic particles 26 have moved to the side of the observer) corresponds to a cell thickness of 1 μm, and the brightness is 81%. If the state in which most electrophoretic particles 26 have moved to the side of the element region 7 means that the cell thickness is 20 μm, the brightness depends on the reflective intensity of the dispersion medium 25 and is 1.5%. Thus, the electrophoretic display having this condition has a contrast of about 55.

TABLE 1

| Cell Thickness | Brightness | Contrast |
| --- | --- | --- |
| 0 μm | 100% | |
| 1 μm | 81.0% | 1.0 |
| 2 μm | 65.6% | 1.2 |
| 3 μm | 53.1% | 1.5 |
| 4 μm | 43.0% | 1.9 |
| 5 μm | 34.9% | 2.3 |
| 6 μm | 28.2% | 2.9 |
| 7 μm | 22.9% | 3.5 |
| 8 μm | 18.5% | 4.4 |
| 9 μm | 15.0% | 5.4 |
| 10 μm | 12.2% | 6.7 |
| 11 μm | 9.8% | 8.2 |
| 12 μm | 8.0% | 10.2 |
| 13 μm | 6.5% | 12.5 |
| 14 μm | 5.2% | 15.5 |
| 15 μm | 4.2% | 19.1 |
| 16 μm | 3.4% | 23.6 |
| 17 μm | 2.8% | 29.1 |
| 18 μm | 2.3% | 36.0 |
| 19 μm | 1.8% | 44.4 |
| 20 μm | 1.5% | 54.8 |
| 21 μm | 1.2% | 67.7 |
| 22 μm | 1.0% | 83.5 |
| 23 μm | 0.8% | 103.1 |
| 24 μm | 0.6% | 127.3 |
| 25 μm | 0.5% | 157.2 |

In the second embodiment, the electrophoretic layer 31 has the partitions 27 to limit the area where the electrophoretic particles 26 are allowed to migrate in the electrophoretic layer 31, so that the uniformity of the distribution of the electrophoretic particles 26 is improved.

Figure 10:
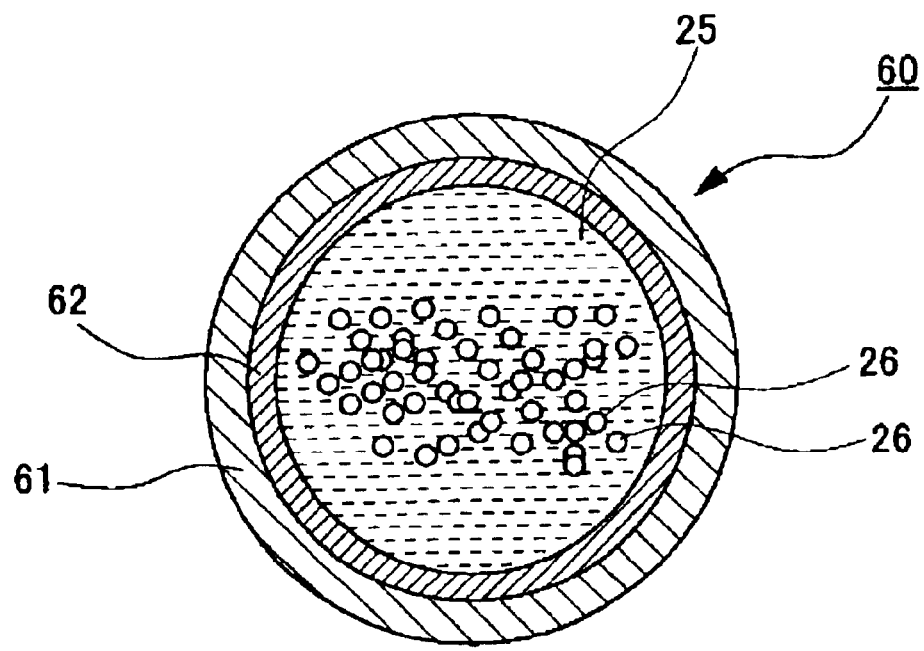
FIG. 10 is a sectional view showing a microcapsule used in the electrophoretic display according to a third embodiment of the present invention.

A microcapsule 60 shown in FIG. 10 may be used instead of the partitioned cell C shown in FIG. 3. FIG. 10 is a sectional view showing a microcapsule 60 applicable to an electrophoretic layer according to the present invention. The microcapsule 60 includes outer and inner capsule film 61 and 62, respectively, which form a double film, a dispersion medium 25, and electrophoretic particles 26, both of which are situated in the space surrounded by the inner capsule film 62. The dispersion medium 25 includes a coloring material, as described in the above embodiments.

In the outer and inner capsule films 61 and 62, respectively, which form a double film, the outer capsule film 61 functions as a protective film and can include a transparent natural polymer such as gelatin or gum arabic or a synthetic polymer such as carboxymethyl cellulose, carboxyethyl cellulose, polyvinyl alcohol, nylon, polyurethane, polyester, epoxy, or melamine-formalin. The inner capsule film 62 comprises the same colorable material as that of the colored layer 34 shown in FIG. 6. The inner capsule film 62 is colored with a coloring material contained in the dispersion medium 25 covered by the inner capsule film 62. Thus, when the plurality of microcapsules 60 are arranged in a matrix on the pixel electrodes 7a of the element region 7 shown in FIG. 3, the same function as that of the electrophoretic layer 31 having the partitioned cells C partitioned by the partitions 27 can be obtained.

In the electrophoretic display including the microcapsules 60 of this embodiment, since the inner capsule film 62 of each microcapsule 60 shown in FIG. 10 functions as a colored layer, sharp color images can be displayed without separately requiring a color filter and a color electrophoretic display can thus be provided at low cost.

Figure 11:
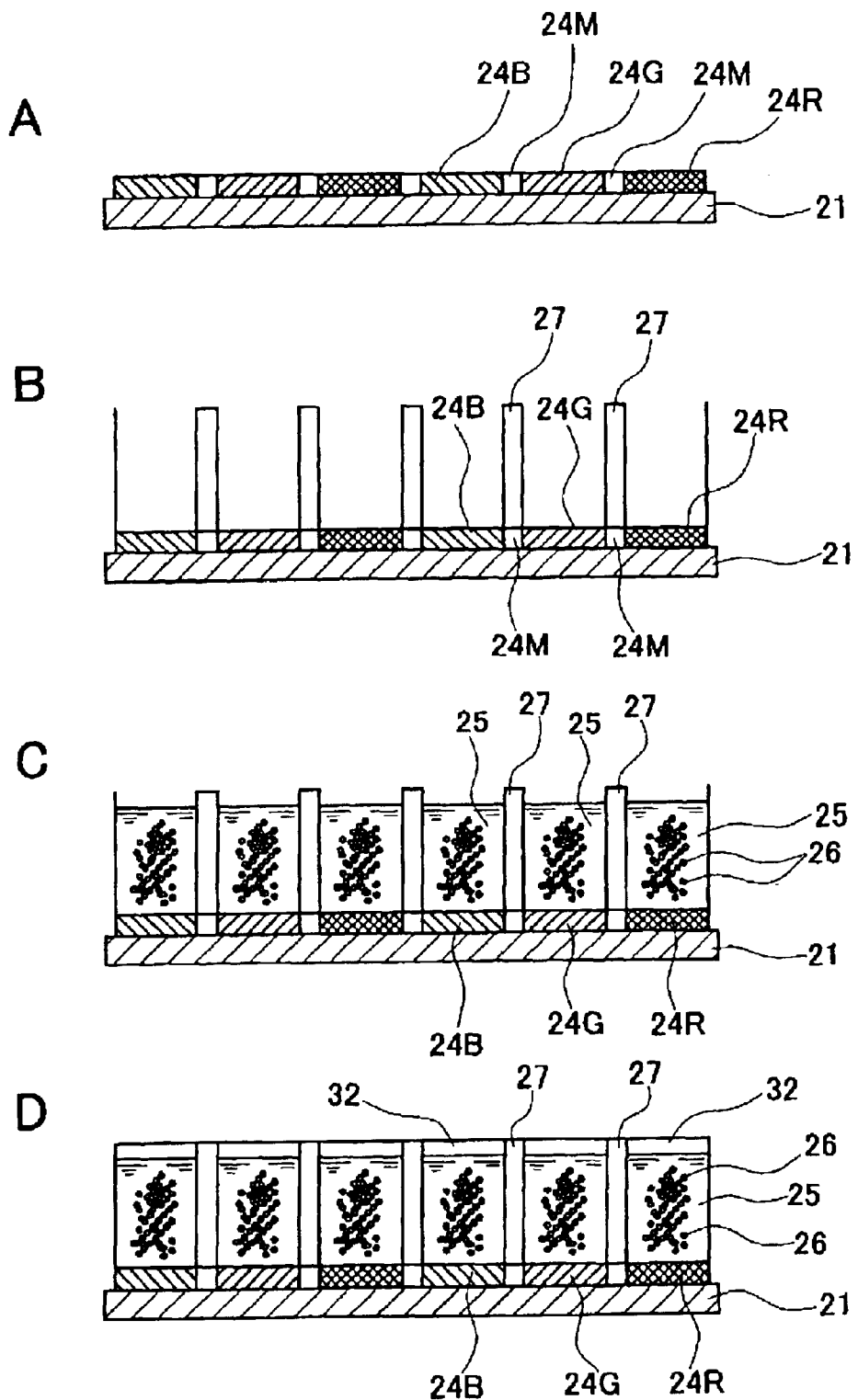
FIGS. 11A–11D are sectional views showing steps for manufacturing an electrophoretic display according to the present invention.

As an exemplary method for manufacturing an electrophoretic display according to the present invention, a method for manufacturing the electrophoretic display shown in FIG. 3 will now be described with reference to FIG. 11. FIGS. 11A to 11D are sectional views showing manufacturing steps in a manufacturing method according to the present invention. In this embodiment, manufacturing steps of an electrophoretic layer (electro-optical layer) according to the present invention are described in detail.

When the electrophoretic display shown in FIG. 3 is manufactured by a method according to the present invention, a common electrode, not shown, is first formed on the first substrate 21. As shown in FIG. 11A, the colored layer 24 including the colored portions 24R, 24G, and 24B and banks 24M for partitioning the colored portions is then formed. The banks 24M function as bases of the partitions 27, described below, and may comprise the same material as the partitions 27. The colored layer 24 may be formed by a known method for manufacturing a color filter. The colored layer 24 may be colored with a dye.

As shown in FIG. 11B, the partitions 27 are formed on the banks 24M so as to have a predetermined height. The height of the partitions 27 corresponds to that of the cells in the electrophoretic display and is 5–50 μm. When the partitions 27 are formed, a resin which is hardened by irradiation with UV, heating, condensation, or addition polymerization is used, such a resin is gradually deposited on the banks 24M by using an ink jet unit, and the deposited resin having a predetermined height is then set.

As shown in FIG. 11C, each region (which corresponds to the partitioned cell C in FIG. 3) partitioned by the partitions 27 is then filled with a dispersion medium 25 and electrophoretic particles 26. The dispersion medium 25 may or may not contain a coloring material. When the dispersion medium 25 contains no coloring material, the colored layer 24 is impregnated in advance with a concentrated dye in the step of forming the colored layer 24 and the partitioned regions are then filled with the dispersion medium 25 in a state that the dye does not get dried, so that the dye in the colored layer 24 leaches into the dispersion medium 25 to color the dispersion medium 25.

As shown in FIG. 11D, a seal 32 is provided on the upper end of each region filled with the dispersion medium 25 and the electrophoretic particles 26 to form the electrophoretic layer according to the present invention. The seal 32 can include a conductive material such as a resin containing carbon or metal fibers. In such a case, since the seal 32 functions as a common electrode, cost reduction can be achieved by the use of common members. Thus, weight-saving and thickness-reduction of the electrophoretic display can also be achieved. When the seal 32 is used as a common electrode, it is not necessary to provide another common electrode on the first substrate 21 before forming the colored layer shown in FIG. 11A. When the seal 32 can include an insulating material, ion implantation may be performed for the seal 32 after finishing sealing to provide conductivity to the seal 32.

Figure 12:
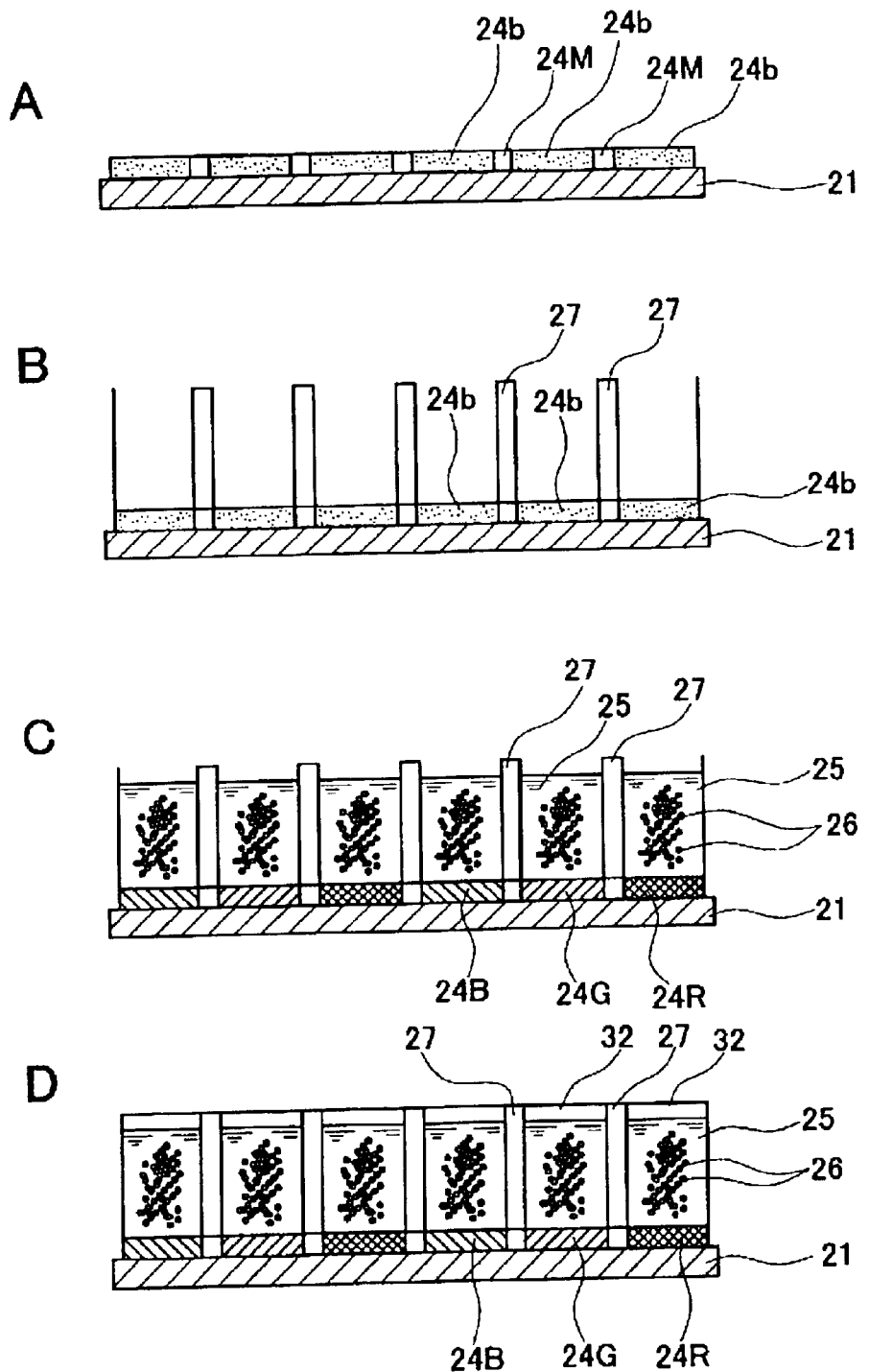
FIGS. 12A–12D are sectional views showing other exemplary steps for manufacturing an electrophoretic display according to the present invention.

In the above description, a method for forming the colored layer 24 by a conventional process for forming a color filter is mentioned. In the electrophoretic display according to the present invention, the colored layer 24 may be formed using a porous material and may then be impregnated with a coloring material to be colored. This method will now be described with reference to FIG. 12.

As shown in FIG. 12A, a plurality of porous portions 24b and banks 24M for partitioning the porous portions 24b at predetermined intervals are formed on a first substrate 21 including glass, a resin film, or the like. The porous portion 24b may comprise porous glass, porous silicon, or the like as describe above and the banks 24M may include a resin or the like.

Figure 13:
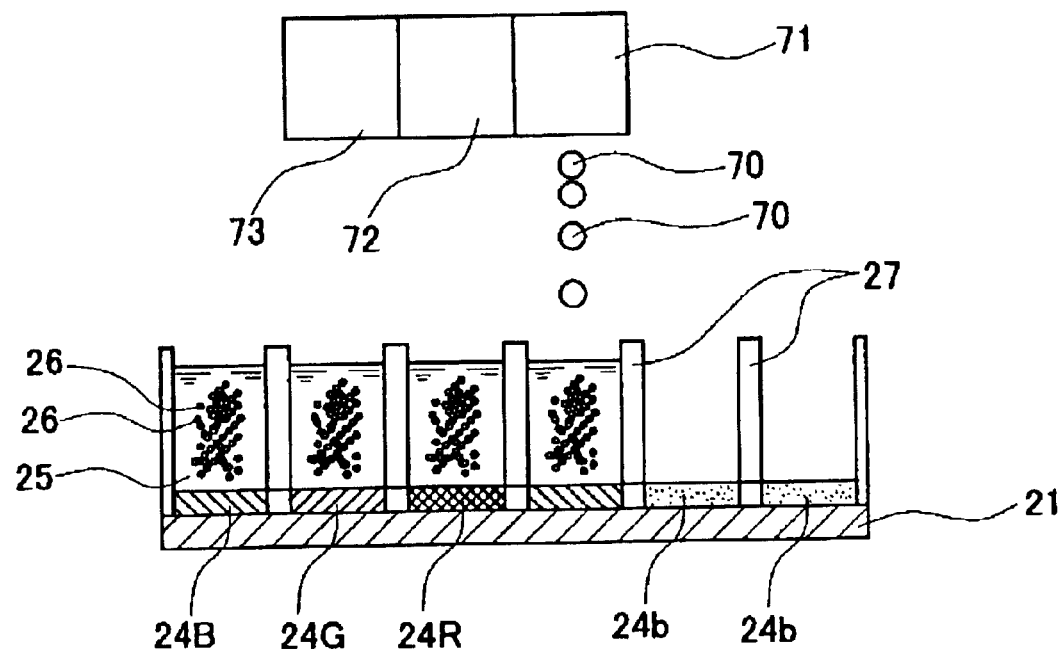
FIG. 13 is an illustration showing an exemplary method for ejecting the dispersion medium shown in FIG. 12C.

As shown in FIG. 12B, partitions 27 are formed on the banks 24M so as to have a predetermined height. The method for forming the partitions 27 may be the same as that described above. As shown in FIG. 12C, each region (partitioned cell C) partitioned by the partitions 27 is then filled with a dispersion medium 25 and electrophoretic particles 26. In this step, the dispersion medium 25 contains a coloring material, the porous portions 24b are colored with the coloring material in the dispersion medium 25 to have a predetermined color, and the colored layer 24 is then completed. FIG. 13 shows that an ink jet unit process is used in this step. As shown in FIG. 13, ink jet units 71–73 each store solution containing the dispersion medium 25 including a coloring material corresponding to R, G, or B. Droplets 70 are ejected from the ink jet units 71–73 into each region partitioned by the partitions 27 to color the porous portions 24b with the coloring material in the droplets 70, and colored portions 24R, 24G, and 24B having each color are then formed in sequence. In this method, since a previously colored layer is not formed but the colored layer 24 is formed by filling dispersion medium 25, a colored layer having various color patterns can be formed and the degree of flexibility in the manufacturing method is thus increased. Furthermore, since the colored layer 24 is formed by ejecting drops of the dispersion medium 25, the number of the steps can be reduced, hence, the production cost is reduced while the yield is increased.

As shown in FIG. 12D, the regions filled with the dispersion medium 25 and the electrophoretic particles 26 are sealed with seals 32 to obtain a electrophoretic layer according to the present invention.

In the manufacturing method of this embodiment, only the steps for forming the electrophoretic layer including the colored layer 24 are described. It should be understood that a method for manufacturing other members, for example, an element region 7, is not limited, and other methods for manufacturing switching elements may also be used without departing from the spirit and scope of the present invention.

In this embodiment, the porous portions 24b are formed and the partitions 27 are then formed. However, the partitions 27 may be provided in-advance on the first substrate 21 to form the porous portions 24b by applying a porous material onto the first substrate 21 partitioned by the partitions 27 or by ejecting the porous material with an ink jet unit.

An electro-optical device according to the present invention is applicable to various electronic apparatus having a display portion. Exemplary applications of electronic apparatuses having an electrophoretic display in the above embodiments will now be described.

Figure 14:
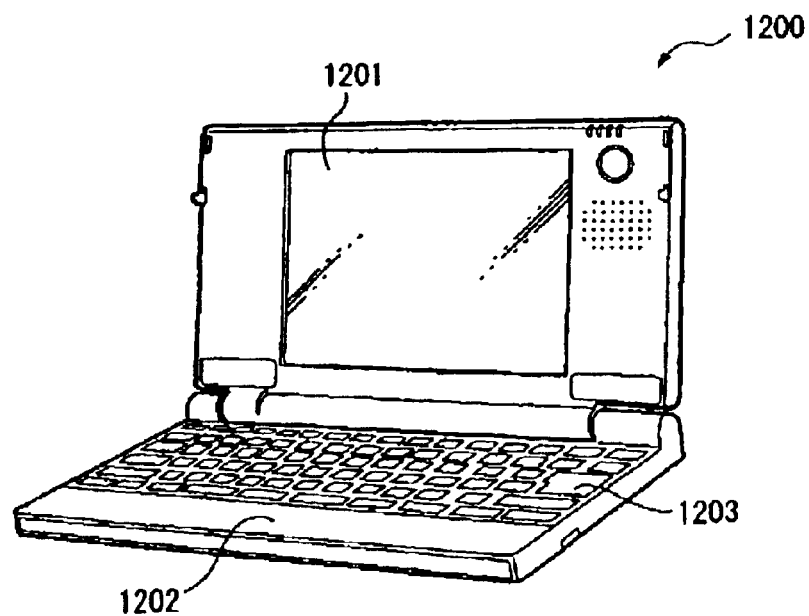
FIG. 14 is an illustration showing an exemplary electronic apparatus according to the present invention.

An exemplary mobile (portable) personal computer having an electrophoretic display according to the present invention will now be described. FIG. 14 is a perspective view showing the configuration of the above personal computer. The personal computer 1200 has a display portion 1201 that is an electrophoretic display according to the present invention. The personal computer 1200 has a main body 1202 including a keyboard 1203.

Figure 15:
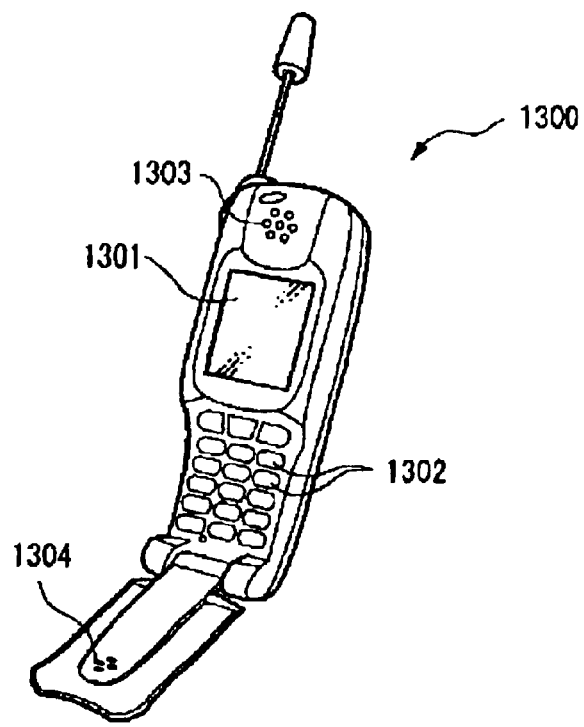
FIG. 15 is an illustration showing an exemplary electronic apparatus according to the present invention.

An exemplary mobile phone having an electrophoretic display according to the present invention will now be described. FIG. 15 is a perspective view showing the configuration of this mobile phone. The mobile phone 1300 has a small display portion 1301 that is an electrophoretic display according to the present invention. The mobile phone 1300 includes a plurality of operating buttons 1302, a ear piece 1303, and a mouth piece 1304.

Figure 16:
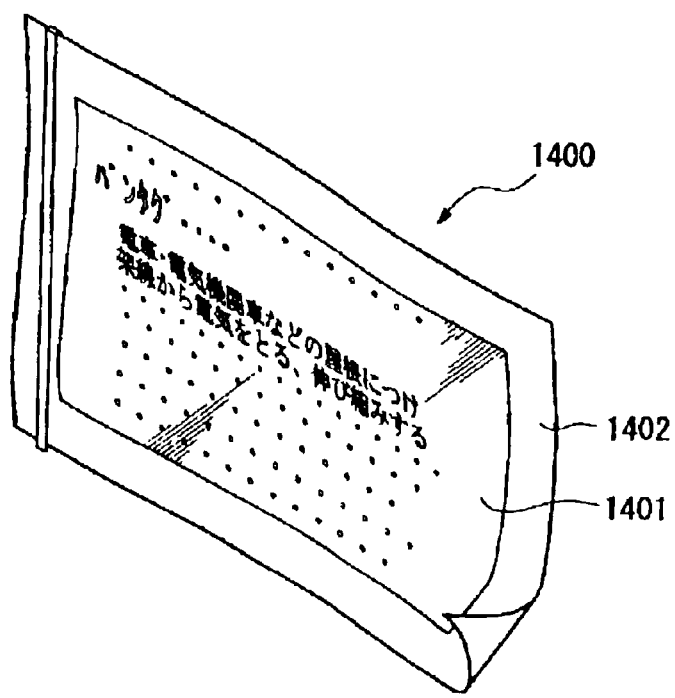
FIG. 16 is an illustration showing an exemplary electronic apparatus according to the present invention.

An exemplary electronic sheet having an electrophoretic display according to the present invention will now be described. FIG. 16 is a perspective view showing the configuration of this electronic sheet. The electronic sheet 1400 has a display portion 1401 that is an electrophoretic display according to the present invention. The electronic sheet 1400 includes a main body 1402 having a rewritable sheet having the same texture and flexibility as that of conventional paper.

Figure 17:
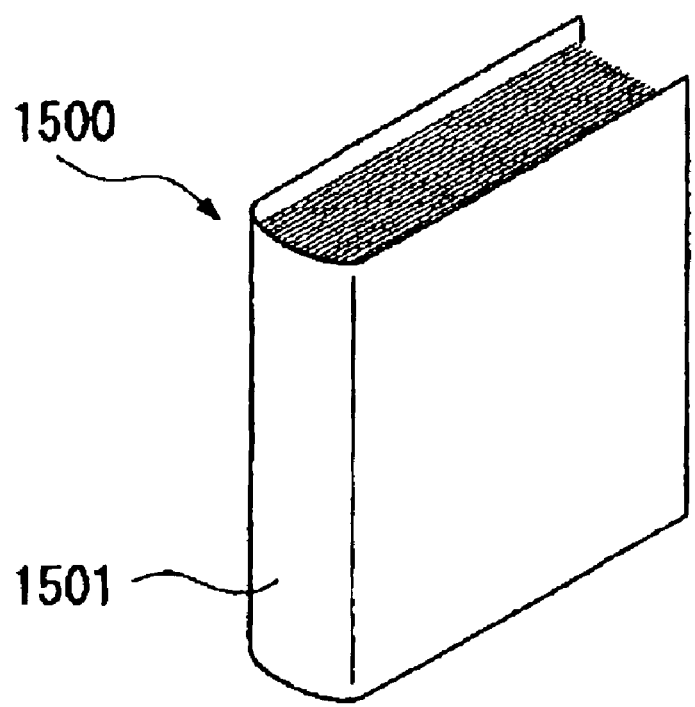
FIG. 17 is an illustration showing an exemplary electronic apparatus according to the present invention.

FIG. 17 is a perspective view showing the configuration of an electronic notebook. The electronic notebook 1500 has a plurality of the bound electronic sheets 1400 shown in FIG. 16 and a cover 1501 sandwiching the electronic sheets 1400. The cover 1501 has, for example, a display-data input means, not shown, for inputting display-data transmitted from an external device. Thus, displayed contents can be changed or updated according to the display-data while the electronic sheets are bound.

In addition to the above examples, other applications include liquid crystal television, a video tape recorder with a viewfinder or a monitor, a car navigation system, a pager, an electronic notebook, a portable calculator, a word processor, a workstation, a picture phone, a POS terminal, devices having a touch panel, and the like. An electro-optical device according to the present invention is applicable to a display portion for such electronic apparatuses.

As described above in detail, an electro-optical device according to the present invention can include a first substrate, a second substrate facing the first substrate, an electro-optical layer which is disposed between the first and second substrates and which includes electrophoretic particles and a dispersion medium, and a colored layer which is located so as to correspond to the electro-optical layer and which includes at least one color element, wherein at least a part of the dispersion medium has substantially the same color as that of the color element. Thus, sharp color images can be displayed and a low-cost electro-optical device can be provided.

While this invention has been described in conjunction with the specific embodiments thereof, it is evident that many alternatives, modifications and variations will be apparent to those skilled in the art. Accordingly, preferred embodiments of the invention as set forth herein are intended to be illustrative not limiting. There are changes that may be made without departing from the spirit and scope of the invention.

What is claimed is:

1. An electro-optical device, comprising:
   an electro-optical layer including electrophoretic particles and a dispersion medium; and
   a colored layer provided at a viewing side of the electro-optical layer, the viewing side of a electro-optical layer being a side of the electro-optical layer that faces a viewer.

2. The electro-optical device according to claim 1, further comprising:
a first substrate; and
a second substrate facing the first substrate,
the electro-optical layer and the colored layer being placed between the first and second substrates.

3. The electro-optical device according to claim 2, further comprising:
a first electrode provided on the first substrate; and
a second electrode provided on the second substrate,
the electro-optical layer and the colored layer being placed between the first and second electrodes.

4. The electro-optical device according to claim 1, further comprising:
a plurality of dot regions,
the colored layer including a plurality of color elements having different colors, and each of the plurality of dot regions corresponding to at least one of the plurality of color elements.

5. The electro-optical device according to claim 4, each of the plurality of dot regions being separated by a partition.

6. The electro-optical device according to claim 1, the electro-optical layer further including capsules that contain the dispersion medium and the electrophoretic particles.

7. The electro-optical device according to claim 6,
the electro-optical layer including a plurality of types of the capsules,
the colored layer including the plurality of color elements having different colors, and
each of the plurality of types of the capsules corresponding to at least one of the plurality of color elements.

8. An electro-optical device, comprising:
an electro-optical layer including electrophoretic particles and a dispersion medium; and
a colored layer provided at a viewing side of the electro-optical layer;
the colored layer having conductivity.

9. An electro-optical device, comprising:
a first substrate;
a second substrate facing the first substrate;
an electro-optical layer including electrophoretic particles and a dispersion medium, the electro-optical layer being placed between the first and second substrates; and
a colored layer including at least one color element, the colored layer being located at a position corresponding to the electro-optical layer, the colored layer provided at a viewing side of the electro-optical layer, the viewing side of the electro-optical layer being a side of the electro-optical layer that faces a viewer,
at least part of the dispersion medium having substantially a same color as that of a color element.

10. The electro-optical device according to claim 9, the color elements included in the colored layer being dispersed in the dispersion medium.

11. The electro-optical device according to claim 9, further comprising:
a plurality of dot regions,
the colored layer including a plurality of color elements having different colors,
each of the plurality of dot regions corresponding to at least one of the plurality of color elements, and
in the dot regions, the dispersion medium having substantially the same color as that of the color elements corresponding to the dispersion medium.

12. The electro-optical device according to claim 11, each of the plurality of the dot regions being separated by a partition.

13. The electro-optical device according to claim 9,
the first substrate having electrodes on an inside face thereof, and
the colored layer being disposed between the electrodes and the electro-optical layer.

14. An electro-optical device, comprising:
a first substrate;
a second substrate facing the first substrate;
an electro-optical layer including electrophoretic particles and a dispersion medium, the electro-optical layer being placed between the first and second substrates; and
a colored layer including at least one color element, the colored layer being located at a position corresponding to the electro-optical layer,
at least a part of the dispersion medium having substantially a same color as that of the color element;
the colored layer having a member with a plurality of pores,
the dispersion medium including coloring material having a diameter the same as or smaller than that of the pores, and
the electrophoretic particles having a diameter larger than that of the pores.

15. The electro-optical device according to claim 14, the coloring material including a dye.

16. The electro-optical device according to claim 11, the electro-optical layer further including capsules containing the dispersion medium and the electrophoretic particles.

17. The electro-optical device according to claim 16,
the electro-optical layer including a plurality of types of the capsules,
the colored layer including the plurality of color elements having different colors,
each of the plurality of types of capsules corresponding to at least one of the plurality of color elements, and
in the capsules, the dispersion medium having substantially the same color as that of the color elements corresponding to the dispersion medium.

18. An electronic apparatus comprising the electro-optical device according to claim 1 functioning as a display portion.

19. An electronic apparatus comprising the electro-optical device according to claim 9 functioning as a display portion.

* * * * *